US012077972B2

(12) United States Patent
Hiller et al.

(10) Patent No.: US 12,077,972 B2
(45) Date of Patent: Sep. 3, 2024

(54) ALIGNMENT DEVICE FOR CONCRETE FORMS

(71) Applicant: Plumwall Bracing Systems Inc., St. Jacobs (CA)

(72) Inventors: Chad Hiller, St. Jacobs (CA); Jeff Brubacher, St. Jacobs (CA)

(73) Assignee: Plumwall Bracing Systems Inc., St. Jacobs (CA)

( * ) Notice: Subject to any disclaimer, the term of this patent is extended or adjusted under 35 U.S.C. 154(b) by 56 days.

(21) Appl. No.: 17/533,453

(22) Filed: Nov. 23, 2021

(65) Prior Publication Data

US 2022/0162868 A1 May 26, 2022

Related U.S. Application Data

(60) Provisional application No. 63/116,982, filed on Nov. 23, 2020.

(51) Int. Cl.

| | |
|---|---|
| ***E04G 17/14*** | (2006.01) |
| ***B66F 3/08*** | (2006.01) |
| ***E04G 17/00*** | (2006.01) |
| ***E04G 21/26*** | (2006.01) |
| ***E04G 25/04*** | (2006.01) |

(52) U.S. Cl.

CPC ................ *E04G 25/04* (2013.01); *B66F 3/08* (2013.01); *E04G 17/002* (2013.01); *E04G 17/14* (2013.01); *E04G 21/26* (2013.01)

(58) Field of Classification Search

CPC ......... E04G 17/14; E04G 21/26; E04G 25/04; E04G 17/002; B66F 3/08; B66F 5/025

USPC .................................................... 254/99, 102

See application file for complete search history.

(56) References Cited

U.S. PATENT DOCUMENTS

| | | | | |
|---|---|---|---|---|
| 2,725,210 | A * | 11/1955 | Swartz .................... | E04G 21/26 248/354.3 |
| 4,272,058 | A | 6/1981 | Van Santen | |
| 5,855,360 | A * | 1/1999 | Wurdack ................... | B66F 3/08 254/133 R |

(Continued)

FOREIGN PATENT DOCUMENTS

| | | | | |
|---|---|---|---|---|
| CA | 2313513 | A1 * | 1/2002 | ............... E04G 1/20 |
| CN | 104314305 | A * | 1/2015 | ............. E04G 11/34 |

(Continued)

OTHER PUBLICATIONS

Translation of JP H0313664 A. (Year: 1991).*

(Continued)

*Primary Examiner* — Brent W Herring

(74) *Attorney, Agent, or Firm* — Gowling WLG (Canada) LLP

(57) ABSTRACT

A brace for supporting a concrete form is disclosed. The brace includes a strongback couplable to an insulated concrete form, a platform coupled to the strongback, and an outrigger. The brace includes an adjustment mechanism having a casing portion coupled to the platform, a manipulable body housed within the casing portion, and a retaining body housed within the casing. The manipulable body extends through an opening of the casing portion and is coupled to the outrigger. The adjustment mechanism is manipulable by a single user located on the platform to reposition the outrigger to adjust a plumb of the concrete form.

10 Claims, 10 Drawing Sheets

(56) References Cited

U.S. PATENT DOCUMENTS

| | | | | | |
|---|---|---|---|---|---|
| 6,247,273 | B1 * | 6/2001 | Nickel | E04G 21/26 248/240.2 |
| 6,446,752 | B2 * | 9/2002 | Philippe | E04G 1/20 182/150 |
| 6,539,677 | B1 * | 4/2003 | Lanka | E04G 21/26 248/354.3 |
| 7,913,463 | B2 * | 3/2011 | Russell | E04G 17/14 52/651.1 |
| 2002/0073634 | A1 * | 6/2002 | Bolinger | E04G 21/26 52/127.2 |
| 2009/0057518 | A1 * | 3/2009 | Russell | E04G 21/26 248/354.1 |
| 2009/0229205 | A1 * | 9/2009 | Bradley | E04B 2/8605 52/651.1 |
| 2010/0012811 | A1 | 1/2010 | Mackenzie et al. | |
| 2011/0210234 | A1 * | 9/2011 | Garcia, Jr. | E04G 17/14 249/213 |
| 2013/0175419 | A1 * | 7/2013 | Wheeler | E05C 17/02 248/354.1 |
| 2016/0076262 | A1 * | 3/2016 | Scott | E04G 17/14 249/219.2 |
| 2019/0112829 | A1 * | 4/2019 | Manos | E04B 1/2604 |
| 2021/0370888 | A1 * | 12/2021 | Peacemaker | B66F 3/10 |
| 2022/0112733 | A1 * | 4/2022 | Ferreira | E04G 17/0651 |

FOREIGN PATENT DOCUMENTS

| | | | | | |
|---|---|---|---|---|---|
| CN | 106193598 | A * | 12/2016 | E04G 17/14 |
| DE | 202006019268 | U1 * | 6/2007 | E04G 11/365 |
| DE | 202012010930 | U1 * | 1/2014 | E04G 17/14 |
| EP | 1653025 | A2 * | 5/2006 | E04G 11/10 |
| EP | 1974106 | A | 10/2008 | |
| FR | 2058750 | A5 * | 5/1971 | E04G 17/002 |
| FR | 2442936 | A1 * | 6/1980 | E04G 17/14 |
| FR | 2580019 | A * | 10/1986 | E04G 17/14 |
| FR | 2609488 | A1 * | 7/1988 | E04G 17/002 |
| FR | 2620480 | A1 * | 3/1989 | E04G 17/002 |
| FR | 2685723 | A1 * | 7/1993 | E04G 17/14 |
| FR | 2884536 | A1 | 10/2006 | |
| FR | 2944329 | A1 | 10/2010 | |
| FR | 3080875 | A1 * | 11/2019 | E04G 11/085 |
| FR | 3045087 | B1 * | 5/2021 | E04G 11/06 |
| JP | H03013664 | A * | 1/1991 | |
| KR | 2018002527 | U * | 8/2018 | E04G 25/04 |
| KR | 2020180002527 | * | 8/2018 | E04G 25/04 |
| KR | 1928033 | B1 * | 12/2018 | E04G 17/14 |
| KR | 101928033 | B1 * | 12/2018 | E04G 17/14 |
| KR | 2020011063 | A * | 2/2020 | E04G 11/08 |
| NZ | 567555 | A | 2/2010 | |
| WO | WO-8302794 | A1 * | 8/1983 | E04G 17/14 |
| WO | WO-02095163 | A2 * | 11/2002 | E04G 17/002 |
| WO | WO-2010088628 | A1 * | 8/2010 | E04G 11/08 |
| WO | WO-2013177682 | A1 * | 12/2013 | E04G 21/3233 |

OTHER PUBLICATIONS

Search Report Under Section 17 for Great Britain Patent Application GB2116824.0 dated May 23, 2022.

Plumwall ICF Bracing "Plumwall ICF Bracing System. All in One Setup" available from YouTube (RTM) via https://www.youtube.com/watch?v=HOaJCVer7XY Oct. 7, 2015 [accessed on May 19, 2022].

* cited by examiner

ALIGNMENT DEVICE FOR CONCRETE FORMS

CROSS-REFERENCE TO OTHER APPLICATIONS

The disclosure claims priority from U.S. Provisional Application No. 63/116,982 filed Nov. 23, 2020 which is incorporated herein by reference.

FIELD OF THE DISCLOSURE

The disclosure is generally directed at supporting concrete forms and, more specifically, at alignment devices for wall braces for supporting concrete forms.

BACKGROUND

A typical practice for constructing concrete structures is to pour the concrete into forms that define the shape of the resulting structure. In the case that Insulating Concrete Forms (ICFs) are used, the form becomes integrated with the resulting concrete structure. The integrated ICFs may provide thermal insulation, moisture inhibition, soundproofing, backing for wall finishes, and/or space to run conduits.

When using the ICF, a brace is typically placed against the ICF to perform or enable different functionality. The brace may provide access to the top of the wall for the worker to pour concrete into the ICF, such as via a hose connected to a concrete pump truck. The brace may also keep empty ICF forms from blowing over during the installation phase. Also, the brace may plumb or align the wall before, during and after the wall is poured full of concrete.

In some cases, the brace may assist the ICF in reducing the likelihood of blow outs occurring when the ICF contains uncured concrete, however the brace does not typically perform the function of resisting pressure exerted by uncured concrete. This function is typically performed by the ICF itself, via internal webbing within the ICF and/or a rebar installed within the ICF.

Typically, the braces are carefully aligned with the intended shape of the concrete structure to ensure that the resulting concrete structure is plumb i.e. having surfaces aligned to a true horizontal or true vertical. Conventional braces position the adjustment mechanism near the ground, but the measurements necessary to ensure that the brace is plumb must be performed at a height above the ground where the brace contacts the form. In other words, conventional braces require two workpersons to adjust to plumb, one to manipulate the adjustment mechanism and a second to check that the manipulation has resulted in a plumb form. Current adjustment mechanisms may also contain relatively delicate components that are prone to failure.

Therefore, the disclosure provides a concrete form brace that is robust and adjustable that may be handled by a single workperson.

SUMMARY

In one aspect of the disclosure, there is provided an adjustment mechanism for a brace for supporting a concrete form. The adjustment mechanism includes a casing portion, a manipulable body housed within the casing portion, and a retaining body for retaining the manipulable body within the casing. The manipulable body has a first end extending through an opening of the casing portion providing access to the first end to a single user located on the brace and a second end for coupling to an outrigger. The manipulable body is rotatable via its first end to reposition the outrigger, wherein rotation of the manipulable body by the single user repositions the outrigger to adjust a plumb of the concrete wall. Rotation of the manipulable body and adjustment of the plumb of the concrete wall is accomplished by the single user.

In an aspect, the retaining body is a weld nut. In an aspect, the retaining body is a rounded bushing coupled to the threaded bolt via a weld. In an aspect, the manipulable body is a threaded bolt having a head and threading, the head positioned at the first end, wherein the threaded bolt is couplable to the outrigger via the threading. In an aspect, the head is a hex head compatible with a complementary socket, the complementary socket coupleable to a handheld drill. In an aspect, the threaded bolt comprises steel plated with zinc. In an aspect, the casing portion comprises tube steel.

In one aspect of the disclosure, there is provided a brace for supporting a concrete form. The brace includes a strongback couplable to a concrete form, a platform coupled to the strongback, an outrigger, and an adjustment mechanism. The adjustment mechanism includes a casing portion coupled to the platform, a manipulable body housed within the casing portion, and a retaining body for retaining the manipulable body within the casing. The manipulable body has a first end extending through an opening of the casing portion providing access to the first end to a single user located on the platform and a second end coupled to the outrigger. The manipulable body is rotatable via its first end to reposition the outrigger wherein rotation of the manipulable body by the single user repositions the outrigger to adjust a plumb of the concrete form. Rotation of the manipulable body and adjustment of the plumb of the concrete form is accomplished by the single user.

In an aspect, the retaining body is a weld nut. In an aspect, the retaining body is a rounded bushing coupled to the threaded bolt via a weld. In an aspect, the manipulable body is a threaded bolt having a head and threading, the head positioned at the first end, wherein the threaded bolt is couplable to the outrigger via the threading. In an aspect, the head is a hex head compatible with a complementary socket, the complementary socket coupleable to a handheld drill. In an aspect, the threaded bolt comprises steel plated with zinc. In an aspect, the casing portion comprises tube steel. In an aspect, the brace further includes an angled support positioned on an exterior of the adjustment mechanism, wherein the adjustment mechanism is configured to support at least part of a load of the platform via the angled support. In an aspect, the angled support is removably coupled to the strongback and rotatably coupled to the adjustment mechanism to enable folding of the brace. In an aspect, the strongback includes a vertical channel dimensioned to accommodate at least one of the platform, the angled support, the adjustment mechanism, or the outrigger when the brace is folded.

DESCRIPTION OF THE DRAWINGS

Embodiments of the present disclosure will now be described, by way of example only, with reference to the attached Figures.

DESCRIPTION

The disclosure is generally directed at an adjustment mechanism for use with a brace supporting a concrete form. In another embodiment, the disclosure is directed at a brace for supporting a concrete form that includes an adjustment mechanism. In one embodiment, the brace includes a platform supported by a strongback and an outrigger where the outrigger supports the platform via the adjustment mechanism.

Figure 1:
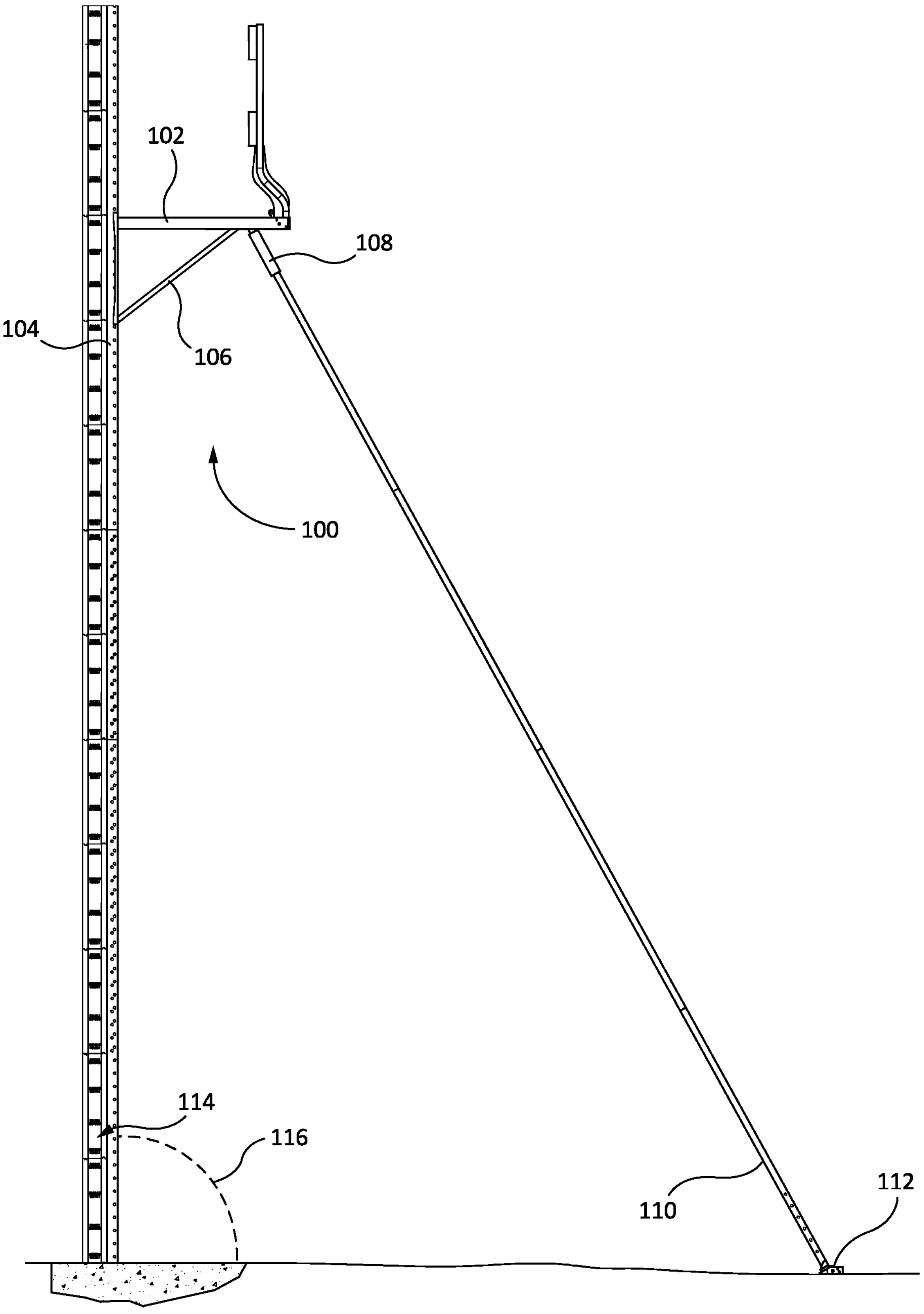
FIG. 1 is a schematic diagram of an adjustable brace supporting an ICF according to an embodiment herein.

Turning to FIG. 1, a schematic diagram of an adjustable brace 100 is shown. Adjustable brace 100 includes platform 102, strongback 104, angled bracket 106, alignment mechanism 108, outrigger 110, and outrigger footplate 112. Adjustable brace 100 may be positioned to be in contact with an Insulating Concrete Form ("ICF") 114 to support the ICF 114. In some cases, the ICF may be supported by multiple adjustable braces 100.

Strongback 104 is coupled to a first end of platform 102 and, in the current embodiment, is oriented at approximately a right angle. In one embodiment, strongback 104 may be a vertical channel with a hollow centre dimensioned to accommodate at least one of the platform 102, the angled bracket 106, the alignment mechanism 108, or the outrigger 110 when the brace 100 is folded. A first end of angled bracket 106 is coupled to strongback 104 and a second end is coupled to the platform 102 to support platform 102. Angled bracket 106 may be removably coupled to strongback 104 and may be rotatably coupled to platform 102 or alignment mechanism 108 to allow brace 100 to be folded when not in use. In other words, the platform 102 is couplable to, or coupled to, the strongback 104. In embodiment, the angle between the platform and the strongback is approximately or around 90 degrees.

A first end of alignment mechanism 108 is rotatably coupled to platform 102, and may be located between the angled bracket 106 and the end of platform 102. A first end of outrigger 110 is coupled to a second end of the alignment mechanism 108. The outrigger 110 and the alignment mechanism 108 may have complementary threading to couple the outrigger 110 to the alignment mechanism 108. The alignment mechanism 108 being coupled to platform 102 causes the alignment mechanism 108 to be at platform level, i.e. a manipulable end of the alignment system 108 (described below) is manually accessible by a user located on the platform. Providing an alignment mechanism at platform level allows a single workperson to simultaneously manipulate the alignment mechanism and check the alignment of the strongback 104 to confirm that the ICF 114 is plumb.

Outrigger footplate 112 is coupled to an end of the outrigger to provide support on a surface for the outrigger and the platform 102 or the brace. The brace may be secured to the ground or other work surface via the footplate. For example, outrigger footplate 112 may be secured by screws, rebar, stakes, or the like through footplate and into the ground or other work surface. Platform 102 may include a pocket to accept a safety post, where the safety post may be metal or wood.

In use, brace 100 may be positioned with the strongback 104 in contact with ICF 114 to support ICF 114. Strongback 104 may be attached to ICF 114 via screws or other like fasteners. ICF 114 is therefore aligned with strongback 104, causing an angle 116 of strongback 104 relative to the ground to be equal to the angle of ICF 114 relative to the ground. In other words, the strongback 104 is at least approximately parallel to ICF 114, and therefore rendering the strongback 104 plumb also renders the ICF 114 plumb.

Figure 2:
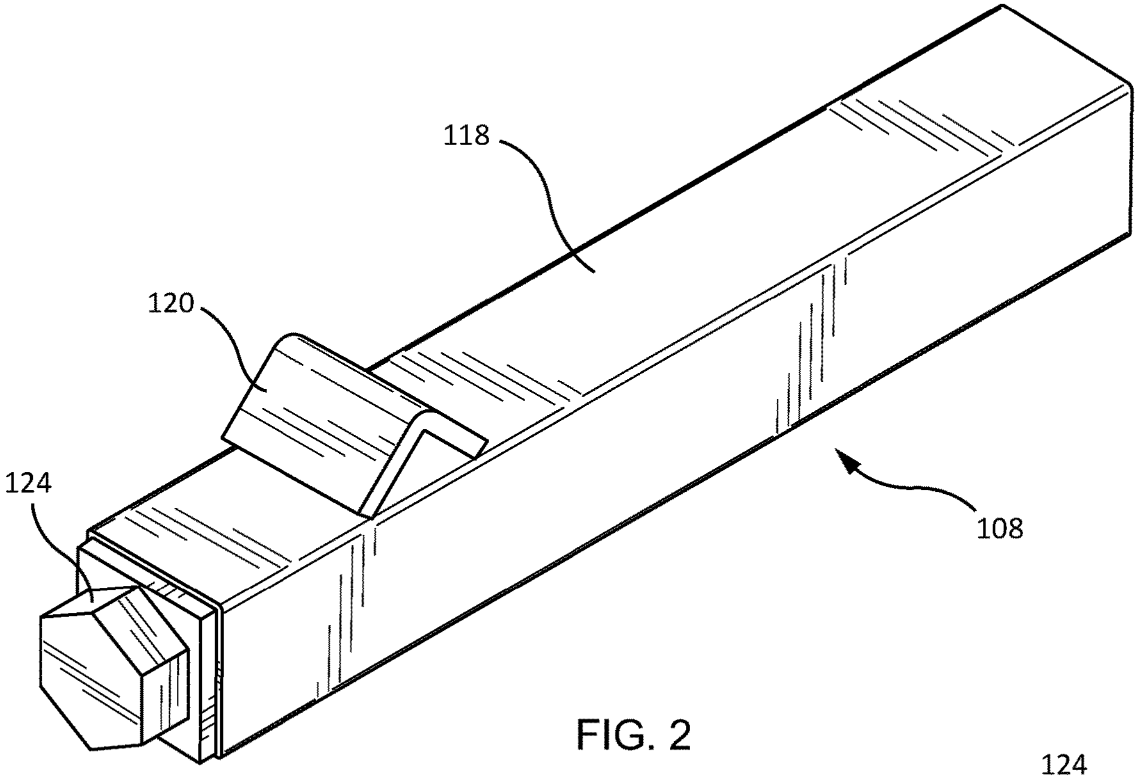
FIG. 2 is a top perspective view of an alignment mechanism according to an embodiment herein.
Figure 3:
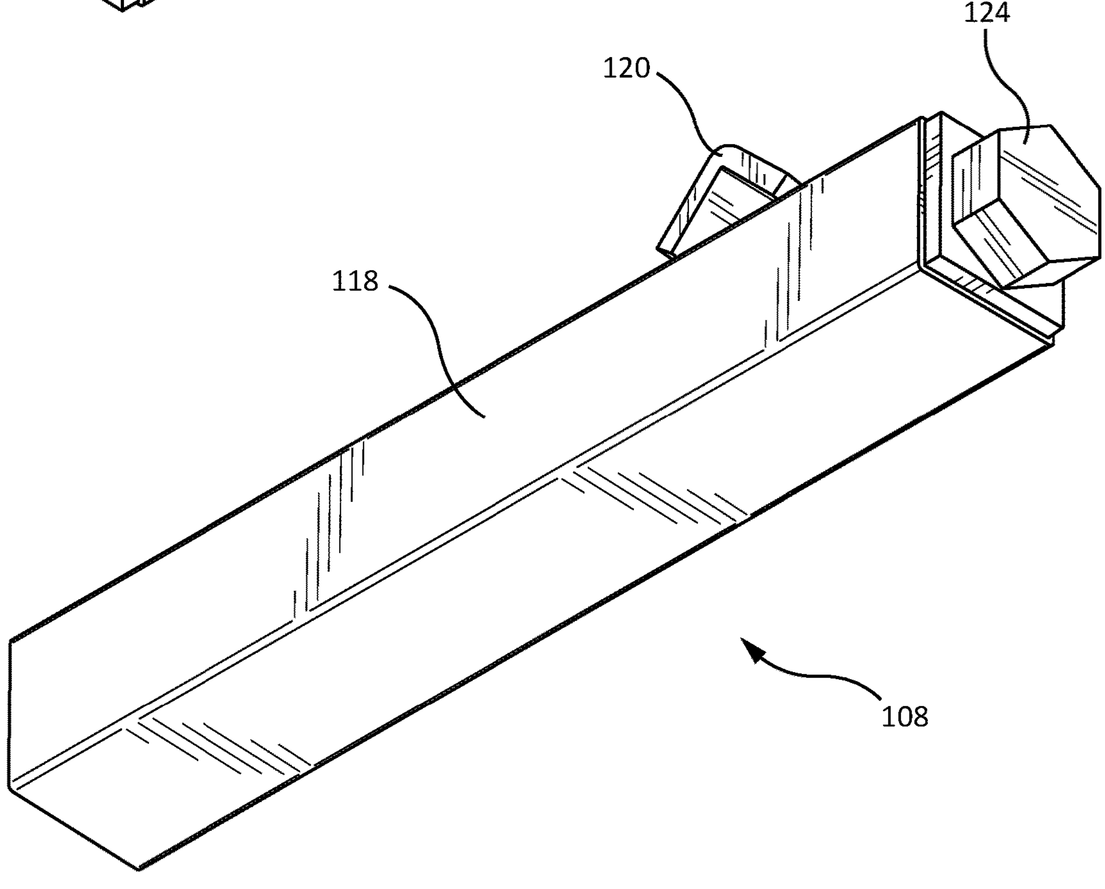
FIG. 3 is a bottom perspective view of the alignment mechanism of FIG. 2.
Figure 4:
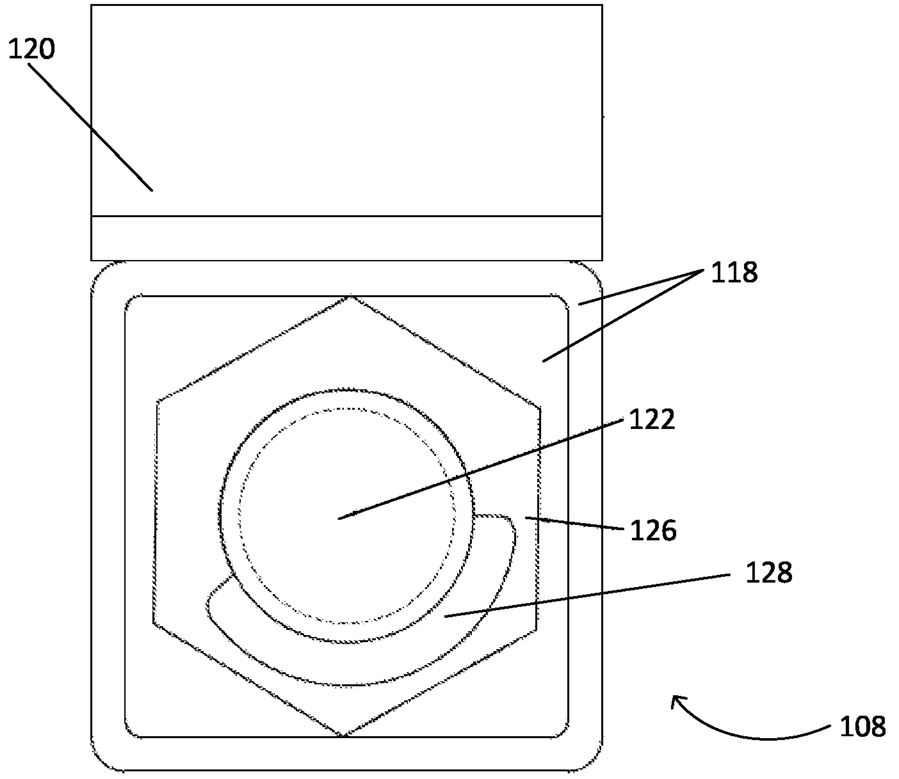
FIG. 4 is a rear view of the alignment mechanism of FIG. 2.
Figure 5B:
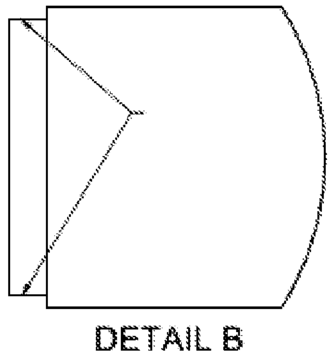
FIG. 5*b* is an enlarged view of circle B in FIG. 5*a;*
Figure 5A:
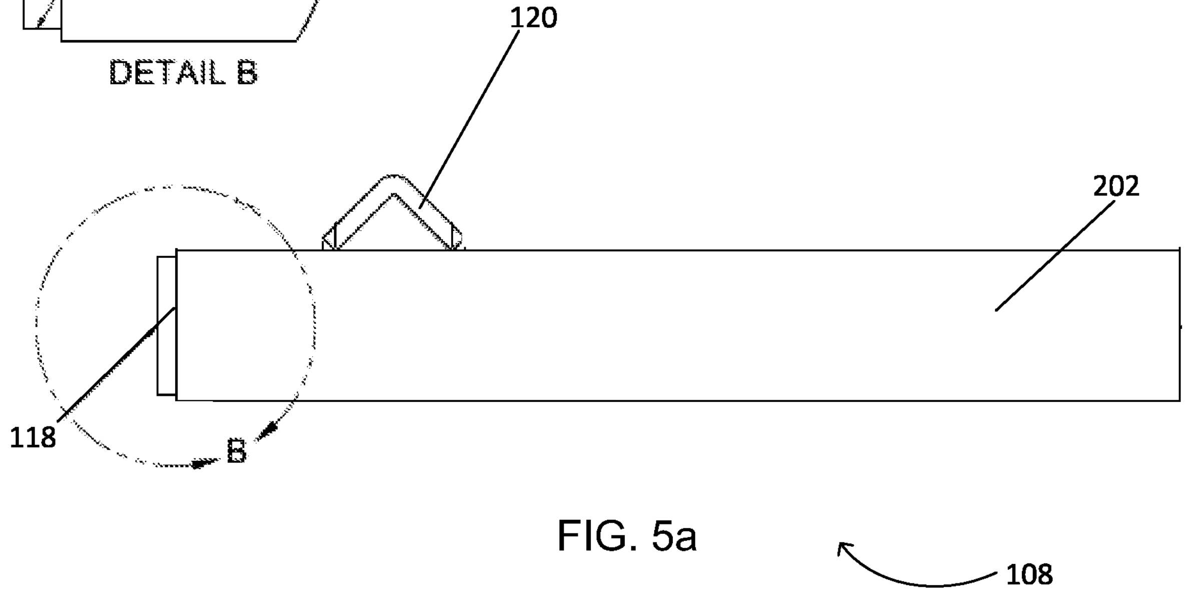
FIG. 5*a* is a side view of the alignment mechanism of FIG. 2.
Figure 6:
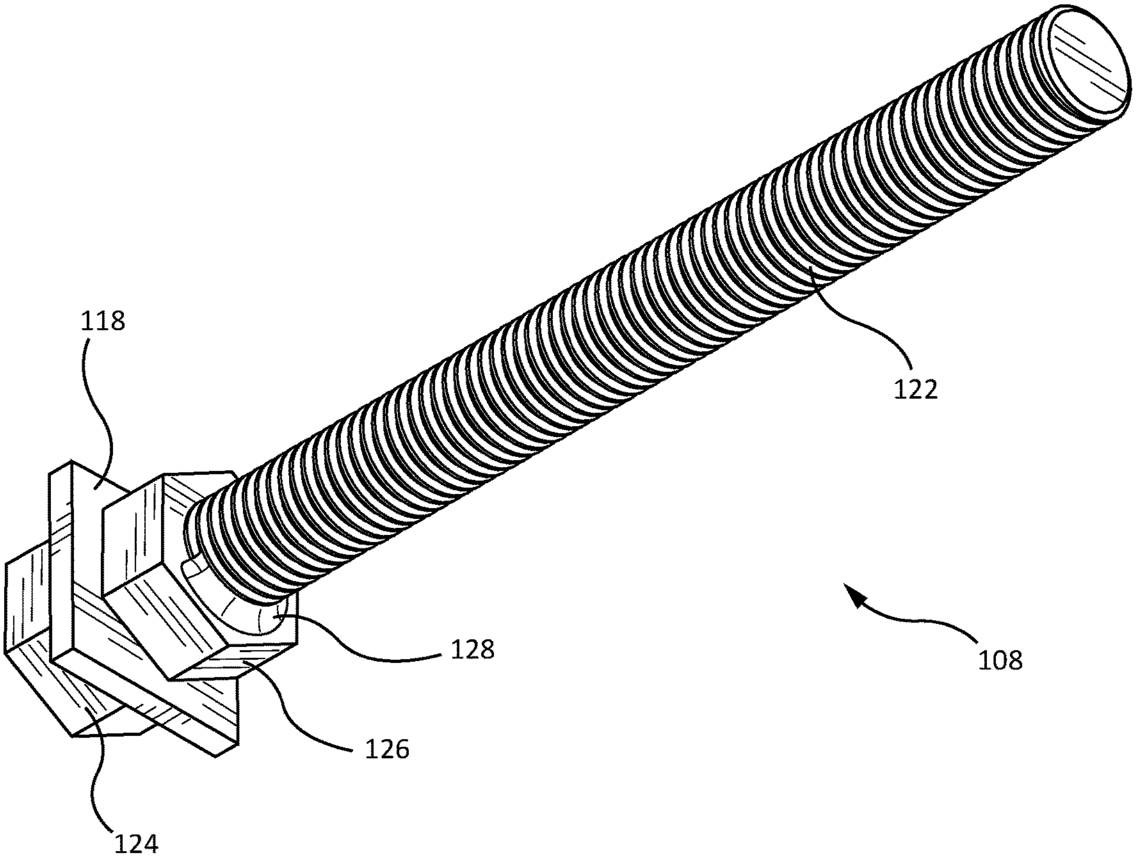
FIG. 6 is a perspective view of the alignment mechanism of FIG. with a portion of a casing omitted.

FIG. 2 is a top perspective view of a first embodiment of an alignment mechanism 108. FIG. 3 is a bottom perspective view of the alignment mechanism 108. FIG. 4 is a rear view the alignment mechanism 108. FIG. 5 is a side view the alignment mechanism 108. FIG. 6 is a perspective view a threaded bolt portion 122 of the alignment mechanism 108.

Alignment mechanism 108 includes a casing 118 with an angled support 120, a threaded bolt 122 having a head 124, and a weld nut 126. The casing 118 includes an opening at an end of the casing through which the threaded bolt 122 passes. The head 124 and the weld nut 126 are positioned on opposite sides of the casing 118 to retain the threaded bolt 122 in the casing 118. The hex nut 126 is a non-exclusive example of a retaining body. The head 124 may be a hex head that may be compatible with a complementary socket mounted on a handheld drill, e.g. a handheld cordless drill. In one embodiment, the adjustment mechanism 108 may bear the weight of the platform load via angled support 120. This is an improvement over conventional systems. In one embodiment, the casing 118 may be steel and may be assembled from a length of square tubing with a square end cap attached to an end of the square tubing, the end cap having the opening. The end cap may be welded to the end of the square tubing. The threaded bolt 122, in combination with the weld nut 126, is a non-exclusive example of a manipulable body.

Figure 7A:
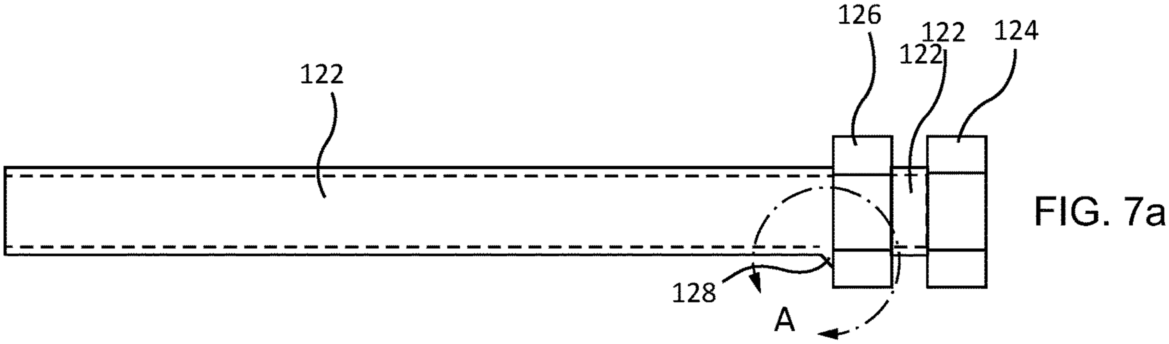
FIG. 7*a* is a side view of a threaded bolt with a welded nut according to an embodiment herein.
Figure 7B:
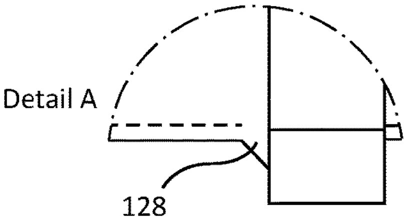
FIG. 7*b* is an enlarged view of circle A in FIG. 7*a;*

FIG. 7 is a side view of the threaded bolt 122 with the weld nut 126. The threaded bolt 122 may be made of steel or any other metal or material having sufficient strength to withstand forces applied to the alignment mechanism 108. The weld nut 126 may be made of steel, or other metals or materials as appropriate. In one embodiment, the weld nut 126 is zinc plated steel and the threaded bolt 122 is a steel full thread bolt. Forming the threaded bolt 122 and the weld nut 126 of steel may increase the durability of the alignment mechanism 108. If the threaded bolt 122 and the weld nut 126 are formed of steel or other metal, the threaded bolt 122 may be welded to the weld nut 126 by weld 128. Welding the weld nut 126 to the threaded bolt 122 may increase the durability of the alignment mechanism 108 by increasing the strength of the attachment of weld nut 126 to the threaded bolt 122. As shown in FIGS. 4 and 6, the weld 128 may extend around only a portion of the circumference of threaded bolt 122. At least one of the threaded bolt 122 and the weld nut 126 may be plated, for example with zinc or gold, to increase corrosion resistance and/or provide a visible indicator of the material of the threaded bolt 122 or the weld nut 126, or both.

The interior of casing 118 is shaped and dimensioned to allow insertion of an end of the outrigger 110. The outrigger 110 may have a threaded opening into which an end of the threaded bolt may be inserted to couple the threaded bolt 122 to outrigger 110. Threaded bolt 122 may be rotated by applying a rotational force to head 124, for example by a cordless drill held by a workperson. Turning the threaded bolt 122 causes movement of the outrigger 110 relative to the alignment mechanism 108 due to the engagement between the complementary threading of outrigger 110 and threaded bolt 122. Turning the threaded bolt 122 in a first direction thereby causes extension of outrigger 110, while turning the threaded bolt 122 in an opposite direction causes retraction of the outrigger. In other words, the threaded bolt 122 is manipulable via the head 124 to reposition the outrigger 110.

When alignment mechanism 108 forms a part of a brace 100, extension or retraction of the outrigger due to turning the threaded bolt 122 causes movement of an upper portion of the strongback 104 relative to the ground since the outrigger is coupled to the ground or work surface via the footplate 112, thereby changing the angle 116 of the strongback 104 relative to the ground. In other words, a workperson may adjust the alignment of strongback 104 by turning the threaded bolt 122. Since the head 124 of the threaded bolt 122 is positioned at an end of the alignment mechanism 108 that is adjacent the platform 102, a workperson positioned above or on platform 102 may adjust the alignment of the strongback 104 with one hand while measuring the alignment of the strongback 104 with another hand such that this may be seen sa a one-person process. For example, the workperson may turn the head 124 with a cordless drill held in one hand while checking the distance between the strongback 104 and a plumbed stringline with their other hand. This is an improvement over current two-person systems.

The angled support 120 may engage with the platform 102. In this case, since the alignment mechanism 108 is coupled to the platform 102 at a distance away from strongback 104, angled support 120 aids in the engagement between alignment mechanism 108 and platform 102 to transfer forces between the ground and the strongback 104 via outrigger 110.

Figure 8:
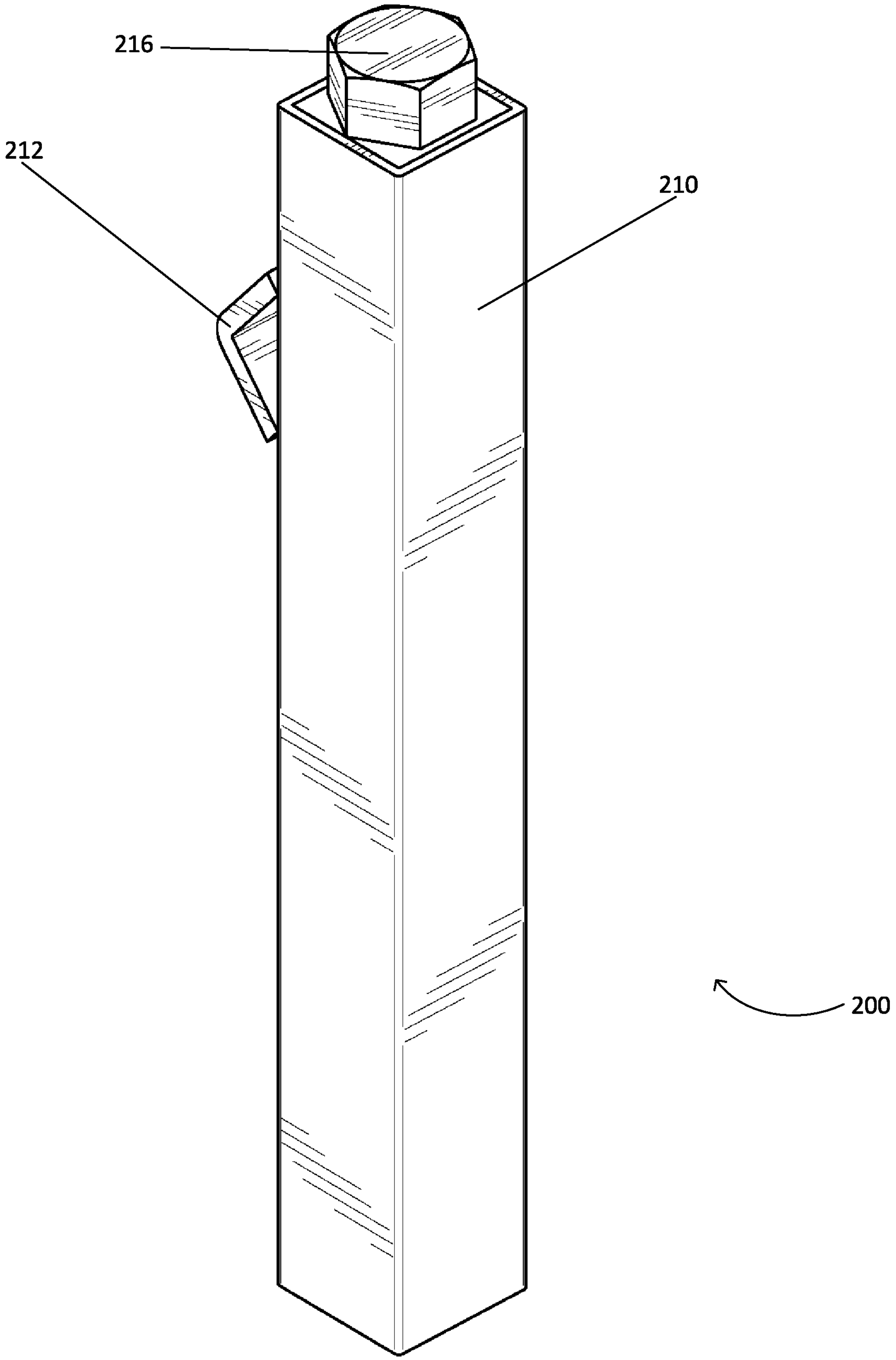
FIG. 8 is a side perspective view of another embodiment of an alignment mechanism.
Figure 9:
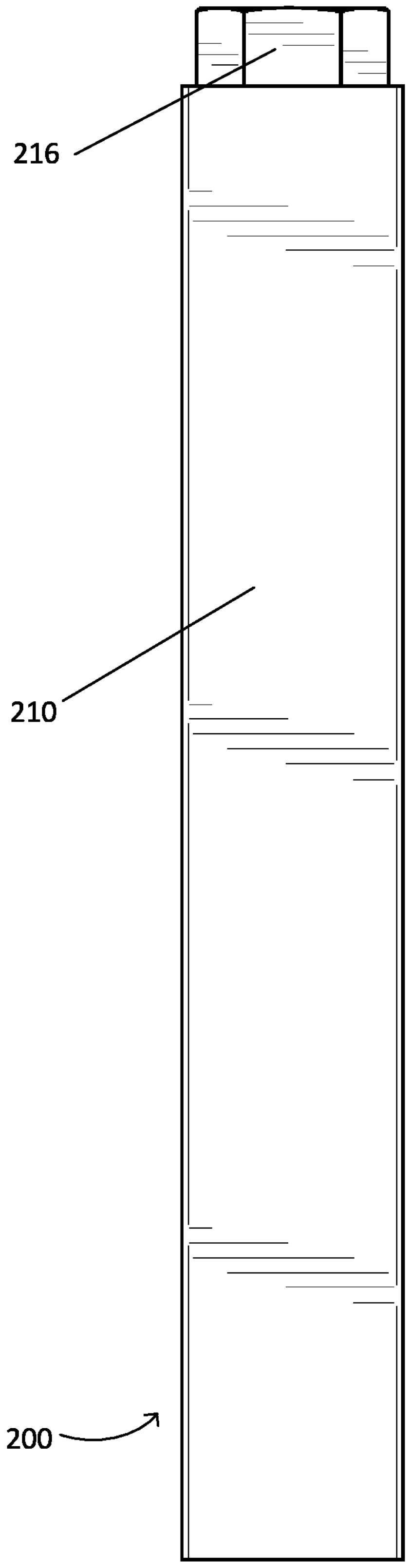
FIG. 9 is a bottom view of the alignment mechanism of FIG. 8.
Figure 10:
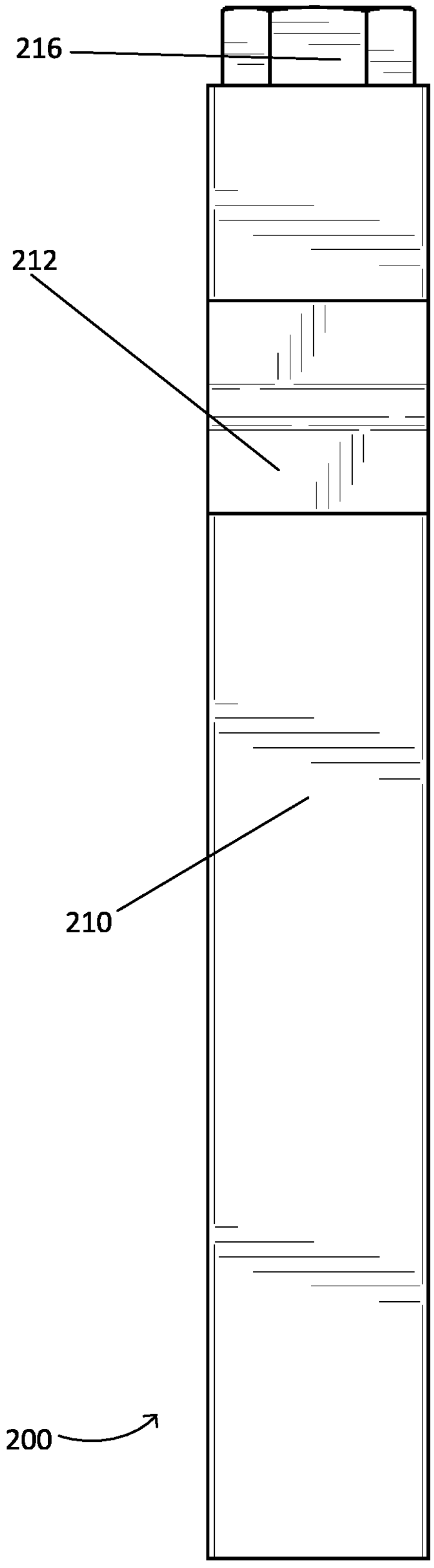
FIG. 10 is a top view of the alignment mechanism of FIG. 8.
Figure 11:
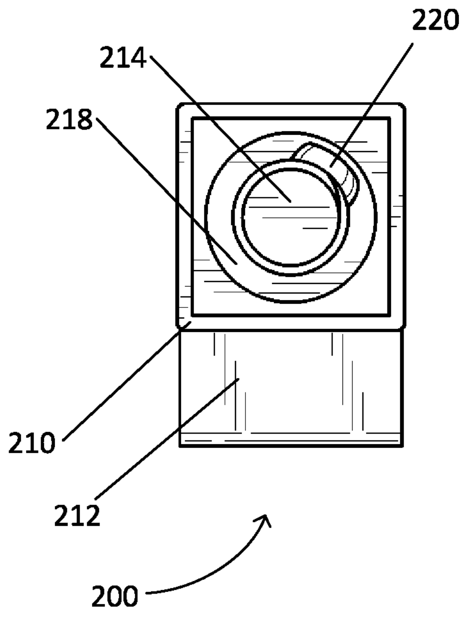
FIG. 11 is a rear view of the alignment mechanism of FIG. 8.
Figure 12:
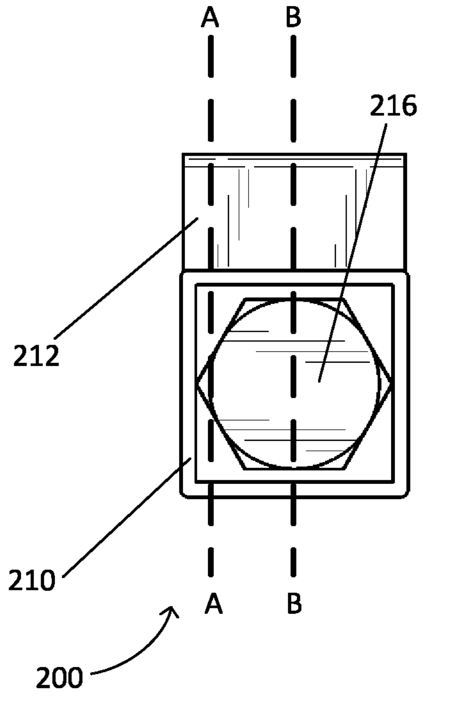
FIG. 12 is a front view of the alignment mechanism of FIG. 8.
Figure 13:
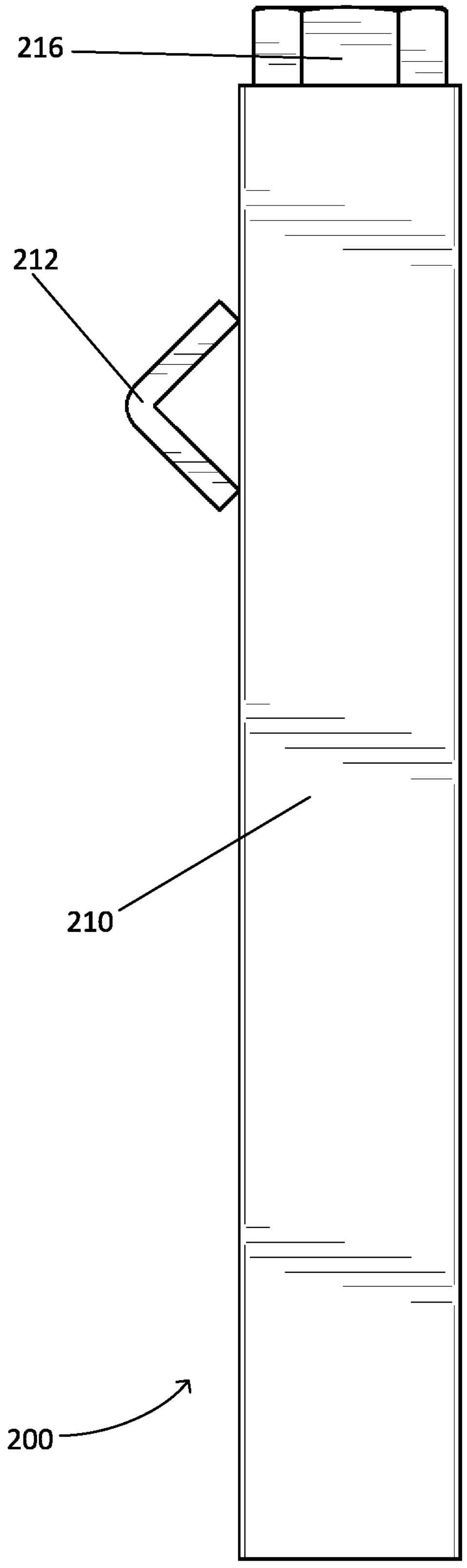
FIG. 13 is a side view of the alignment mechanism of FIG. 8.

FIG. 8 is a side perspective view of another embodiment of an alignment mechanism 200. FIGS. 9, 10, 11, 12, and 13 are bottom, top, rear, front, and side views, respectively, of the alignment mechanism 200. The alignment mechanism 200 includes a casing 210 with an angled support 212, a threaded bolt 214 having a head 216, and a bushing 218. In the current embodiment, the bushing 218 is cylindrical, however other embodiments may have other rounded shapes. The bushing 218 is coupled to the threaded bolt 214 via a weld 220. The alignment mechanism 200 is similar in some ways to the alignment mechanism 108, and may replace the alignment mechanism 108 in the brace 100 of FIG. 1. The casing 210 includes an opening at an end of the casing through which the threaded bolt 214 passes. The head 216 and the bushing 218 are positioned on opposite sides of the casing 210 (within the casing) to retain the threaded bolt 214 in the casing 210. The bushing 218 may be seen as a retaining body. The head 216 may be a hex head, and the hex head may be compatible with a complementary socket mounted on a cordless drill. The threaded bolt 214, in combination with the bushing 218 and the weld 220, is another non-exclusive example of a manipulable body.

Figure 14:
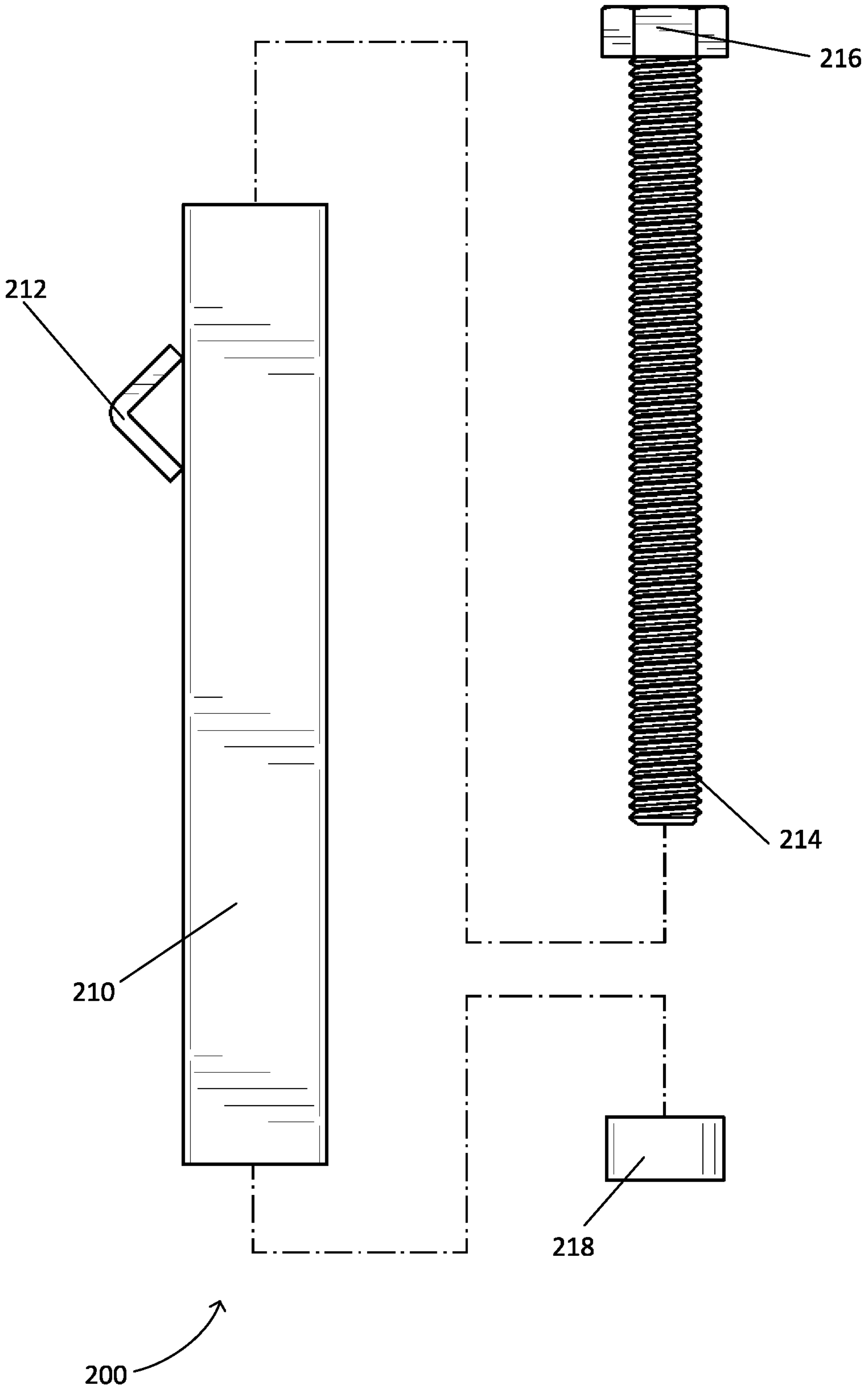
FIG. 14 is an exploded view of the alignment mechanism of FIG. 8 prior to coupling a bushing to a threaded bolt.
Figure 15:
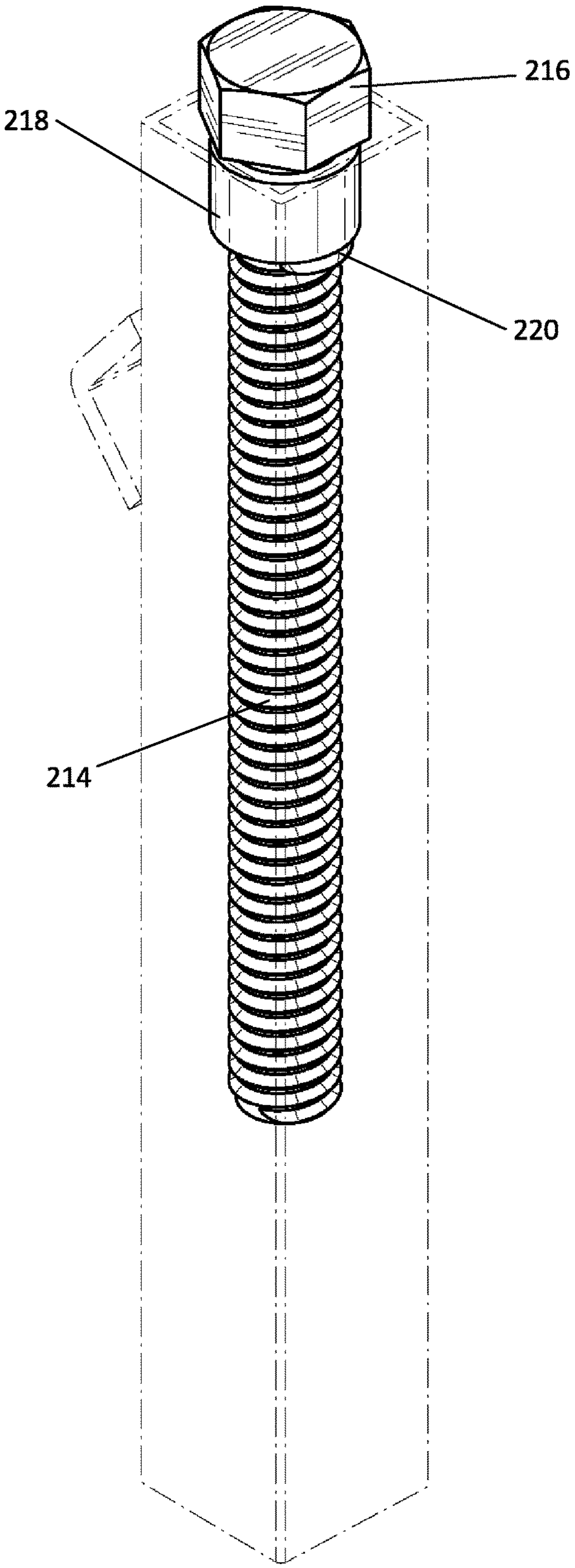
FIG. 15 is a side perspective view of a threaded bolt coupled to a bushing via a weld according to an embodiment herein.
Figure 16:
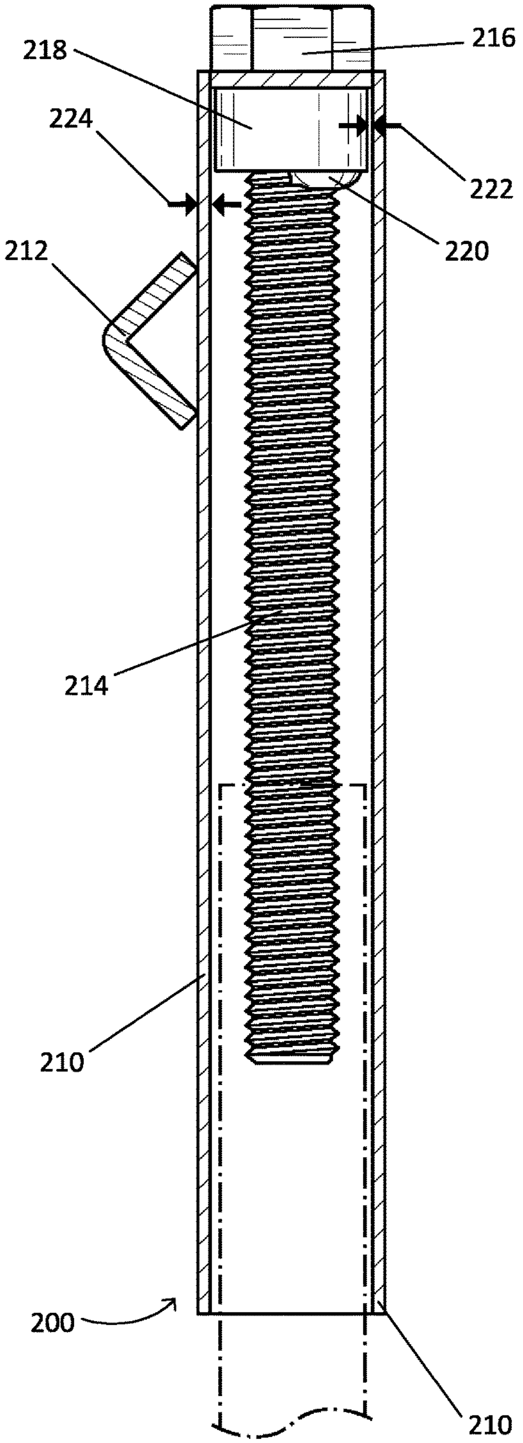
FIG. 16 is a cross-sectional view of the alignment mechanism of FIG. 8 along line A-A of FIG. 12.
Figure 17:
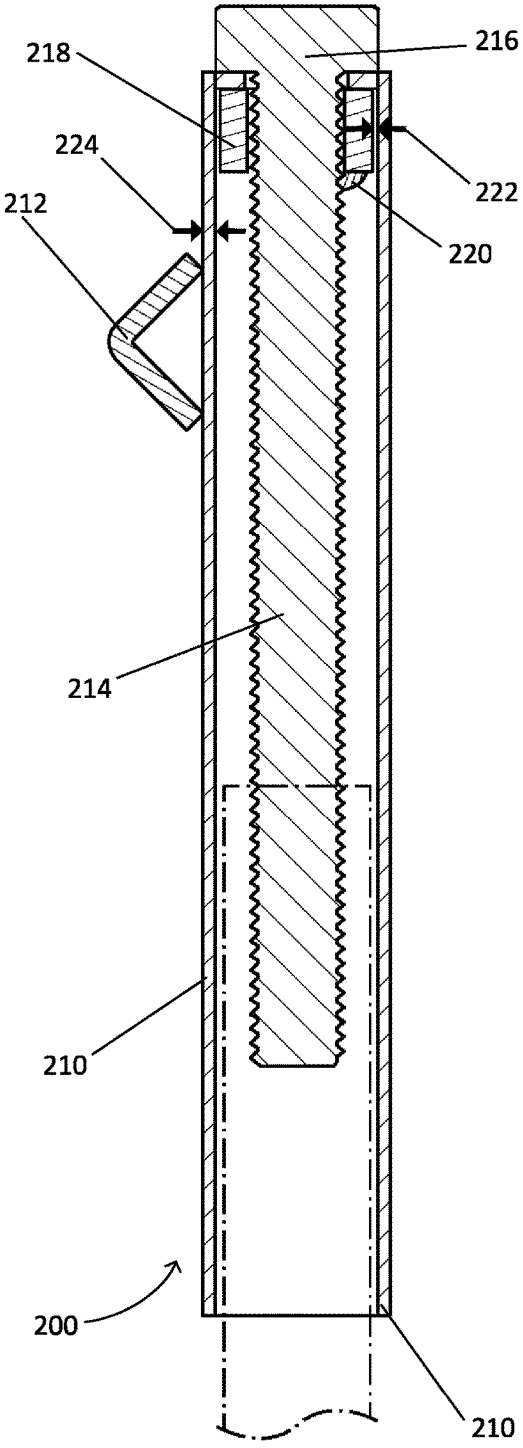
FIG. 17 is a cross-sectional view of the alignment mechanism of FIG. 8 along line B-B of FIG. 12.

FIG. 14 is an exploded view of the alignment mechanism 200. FIG. 15 is a side perspective view of the threaded bolt 214 coupled to the bushing 218 via the weld 220. Dashed lines show the position of a casing relative to the position of the threaded bolt 214, bushing 218, and weld 220 when installed therewithin. FIG. 16 is a cross-sectional view of the alignment mechanism 200 along line A-A of FIG. 12. FIG. 17 is a cross-sectional view of the alignment mechanism 200 along line B-B of FIG. 12.

As shown in the Figs., the casing 210, having a thickness 224, and the bushing 218 are separated by a gap 222. The casing 210 may have a nominal thickness from which the thickness 224 may deviate within a manufacturing tolerance. As such, the size of the gap 222 may vary depending on variances in the thickness 224 within manufacturing tolerances.

The interior of casing 210 is shaped and dimensioned to allow insertion of an end of the outrigger 110, and the outrigger 110 may be extended and retracted by turning the threaded bolt 214 in a manner substantively similar to the alignment mechanism 108 described above. The rounded shape of the bushing 218 reduces or eliminates binding or jamming that may occur between the bushing 218 and the interior of the casing 210 when the bushing rotates. For example, the presence of dirt, debris, or corrosion build-up in the gap 222 is less likely to cause jamming of the bushing 218 as the bushing rotates due to the rounded shape of the bushing 218. In contrast, a hexagonal weld nut may have a size to fit within a casing but be unable to rotate due to the points of the hexagonal nut impinging on the interior of the casing when the gap is too small, for example due to variations in thickness of the casing or due to the buildup of dirt, debris, or corrosion. As such, the alignment mechanism 200 may be less likely to fail over time due to the rounded shape of the bushing 218.

Advantages of the embodiments of the current disclosure include, but are not limited to, adjustability may be performed at a platform level, only a single workperson is required to operate or install the brace/braces and the disclosure may be adjusted for plumb with a single worker from the advantageous location of platform level and drill operated with a hex head design.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

The invention claimed is:

1. A brace for supporting a concrete form, the brace comprising:

a strongback couplable to a concrete form;

a platform coupled to the strongback;

an outrigger; and an adjustment mechanism comprising:

a casing portion coupled to the platform;

a manipulable body housed within the casing portion, the manipulable body having a first end extending through an opening of the casing portion providing access to the first end to a single user located on the platform and a second end coupled to the outrigger, the manipulable body rotatable via its first end to reposition the outrigger; and a retaining body for retaining the manipulable body within the casing;

wherein rotation of the manipulable body by the single user repositions the outrigger to adjust a plumb of the concrete form; and wherein rotation of the manipulable body and adjustment of the plumb of the concrete form is accomplished by the single user.

2. The adjustment mechanism of claim 1, wherein the retaining body is a rounded bushing coupled to the threaded bolt via a weld.

3. The adjustment mechanism of claim 1, wherein the manipulable body is a threaded bolt having a head and threading, the head positioned at the first end, wherein the threaded bolt is couplable to the outrigger via the threading.

4. The adjustment mechanism of claim 3, wherein the head is a hex head compatible with a complementary socket, the complementary socket coupleable to a handheld drill.

5. The adjustment mechanism of claim 3, wherein the threaded bolt comprises steel plated with zinc.

6. The adjustment mechanism of claim 1, wherein the casing portion comprises tube steel.

7. The brace of claim 1, further comprising an angled bracket positioned on an exterior of the adjustment mechanism, wherein the adjustment mechanism is configured to support at least part of a load of the platform via the angled bracket.

8. The brace of claim 7, wherein the angled bracket is removably coupled to the strongback and rotatably coupled to the adjustment mechanism to enable folding of the brace.

9. The brace of claim 8, wherein the strongback includes a vertical channel dimensioned to accommodate at least one of the platform, the angled bracket, the adjustment mechanism, or the outrigger when the brace is folded.

10. The brace of claim 1 wherein the concrete form is insulated.

* * * * *